United States Patent
Kawamura et al.

(10) Patent No.: US 8,526,101 B2
(45) Date of Patent: Sep. 3, 2013

(54) METHOD OF MANUFACTURING DISPLAY MEDIUM, DISPLAY MEDIUM, AND DISPLAY APPARATUS

(75) Inventors: Akihide Kawamura, Kanagawa (JP);
Hideo Kobayashi, Kanagawa (JP);
Takehito Hikichi, Kanagawa (JP);
Masaaki Araki, Kanagawa (JP);
Mamoru Fujita, Kanagawa (JP);
Motohiko Sakamaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/179,051

(22) Filed: Jul. 8, 2011

(65) Prior Publication Data

US 2012/0038970 A1  Feb. 16, 2012

(30) Foreign Application Priority Data

Aug. 13, 2010 (JP) .................. 2010-181277
Apr. 8, 2011 (JP) .................. 2011-086504

(51) Int. Cl.
*G02B 26/00* (2006.01)
*G02B 26/02* (2006.01)
*G02F 1/167* (2006.01)

(52) U.S. Cl.
CPC .................. *G02F 1/167* (2013.01)
USPC ........................ 359/296; 359/228

(58) Field of Classification Search
USPC ........................ 359/290, 296–297
See application file for complete search history.

(56) References Cited

U.S. PATENT DOCUMENTS

| | | |
|---|---|---|
| 6,672,921 B1 | 1/2004 | Liang et al. |
| 6,930,818 B1 | 8/2005 | Liang et al. |
| 2002/0027635 A1* | 3/2002 | Sakamaki et al. ............ 349/153 |
| 2002/0075556 A1 | 6/2002 | Liang et al. |
| 2002/0131152 A1 | 9/2002 | Liang et al. |
| 2002/0182544 A1 | 12/2002 | Chan-Park et al. |
| 2002/0196525 A1 | 12/2002 | Chen et al. |
| 2003/0007238 A1 | 1/2003 | Liang et al. |
| 2003/0035198 A1 | 2/2003 | Liang et al. |
| 2003/0035199 A1 | 2/2003 | Liang et al. |
| 2003/0039022 A1 | 2/2003 | Liang et al. |
| 2003/0043450 A1 | 3/2003 | Liang et al. |
| 2003/0048522 A1 | 3/2003 | Liang et al. |

(Continued)

FOREIGN PATENT DOCUMENTS

| | | |
|---|---|---|
| JP | A-2003-202603 | 7/2003 |
| JP | A-2004-275914 | 10/2004 |

(Continued)

*Primary Examiner* — Scott J Sugarman
*Assistant Examiner* — Robert E Tallman
(74) *Attorney, Agent, or Firm* — Oliff & Berridge, PLC (57) ABSTRACT

The present invention provides a method of manufacturing a display medium, including preparing a first substrate on which a gap retaining member that retains a gap between substrates is disposed in a protruded form; applying an adhesive to a top surface of the gap retaining member; disposing a particle dispersion liquid on an area surrounded by the first substrate and the gap retaining member; and adhering the first substrate and a second substrate together via the gap retaining member, by contacting the second substrate with the adhesive applied to the top surface of the gap retaining member and drying the solvent of the adhesive so as to adhere the second substrate to the top surface of the gap retaining member by the adhesive component of the adhesive. The display medium and a display apparatus including the display medium and an electrical field-generating unit are also provided.

10 Claims, 8 Drawing Sheets

(56) References Cited

U.S. PATENT DOCUMENTS

| | | |
|---|---|---|
| 2003/0053190 A1 | 3/2003 | Liang et al. |
| 2003/0063370 A1 | 4/2003 | Chen et al. |
| 2003/0174385 A1 | 9/2003 | Liang et al. |
| 2003/0179436 A1 | 9/2003 | Liang et al. |
| 2003/0179437 A1 | 9/2003 | Liang et al. |
| 2003/0197915 A1 | 10/2003 | Hou et al. |
| 2003/0197916 A1 | 10/2003 | Chung et al. |
| 2003/0207963 A1 | 11/2003 | Zang et al. |
| 2004/0165252 A1 | 8/2004 | Liang et al. |
| 2004/0169913 A1 | 9/2004 | Chen et al. |
| 2004/0190115 A1 | 9/2004 | Liang et al. |
| 2004/0196527 A1 | 10/2004 | Liang et al. |
| 2004/0246561 A1 | 12/2004 | Liang et al. |
| 2005/0007650 A1 | 1/2005 | Wang et al. |
| 2005/0007651 A1 | 1/2005 | Liang et al. |
| 2005/0012881 A1 | 1/2005 | Liang et al. |
| 2005/0179984 A1 | 8/2005 | Liang et al. |
| 2005/0243406 A1 | 11/2005 | Chung et al. |
| 2005/0259313 A1 | 11/2005 | Wang et al. |
| 2006/0082864 A1 | 4/2006 | Liang et al. |
| 2006/0127667 A1 | 6/2006 | Zang et al. |
| 2006/0132897 A1 | 6/2006 | Chen et al. |
| 2006/0164715 A1 | 7/2006 | Liang et al. |
| 2006/0234053 A1 | 10/2006 | Yamamoto et al. |
| 2006/0238489 A1 | 10/2006 | Liang et al. |
| 2006/0250559 A1* | 11/2006 | Bocko et al. .................. 349/139 |
| 2006/0256424 A1 | 11/2006 | Hou et al. |
| 2006/0284829 A1* | 12/2006 | Moriyama et al. ............ 345/107 |
| 2007/0237962 A1 | 10/2007 | Liang et al. |
| 2007/0268567 A1 | 11/2007 | Chung et al. |
| 2008/0007815 A1 | 1/2008 | Liang et al. |
| 2008/0165411 A1 | 7/2008 | Wang et al. |
| 2008/0220204 A1 | 9/2008 | Ohgaki et al. |
| 2010/0288639 A1 | 11/2010 | Wang et al. |
| 2011/0000605 A1 | 1/2011 | Liang et al. |

FOREIGN PATENT DOCUMENTS

| | | |
|---|---|---|
| JP | B2-3680996 | 8/2005 |
| JP | A-2005-250142 | 9/2005 |
| JP | A-2006-323364 | 11/2006 |
| JP | A-2008-224769 | 9/2008 |
| JP | B2-4377554 | 12/2009 |

* cited by examiner

METHOD OF MANUFACTURING DISPLAY MEDIUM, DISPLAY MEDIUM, AND DISPLAY APPARATUS

CROSS-REFERENCE TO RELATED APPLICATION

This application is based on and claims priority under 35 USC 119 from Japanese Patent Application No. 2010-181277 filed on Aug. 13, 2010 and Japanese Patent Application No. 2011-086504 filed on Apr. 8, 2011.

BACKGROUND

1. Technical Field

The present invention relates to a method of manufacturing a display medium, a display medium and a display apparatus.

2. Related Art

Various studies have been done on display media.

SUMMARY

According to an aspect of the invention, there is provided a method of manufacturing a display medium, including:

preparing a first substrate on which a gap retaining member that retains a gap between substrates is disposed in a protruded form;

applying an adhesive, comprising an adhesive component which is insoluble in a dispersion medium of a particle dispersion liquid and a solvent which is incompatible with the dispersion medium of the particle dispersion liquid, to a top surface of the gap retaining member;

disposing a particle dispersion liquid, comprising migrating particles and a dispersion medium which disperses the migrating particles, on an area surrounded by the first substrate and the gap retaining member; and adhering the first substrate and a second substrate together via the gap retaining member, by contacting the second substrate with the adhesive applied to the top surface of the gap retaining member and drying the solvent of the adhesive so as to adhere the second substrate to the top surface of the gap retaining member by the adhesive component of the adhesive, thereby adhering the first substrate and the second substrate together via the gap retaining member in a state in which the adhesive component of the adhesive is absent on a surface of the second substrate that faces the first substrate, except where the surface corresponds to the top surface of the gap retaining member.

BRIEF DESCRIPTION OF THE DRAWINGS

Exemplary embodiments of the present invention will be described in detail based on the following figures, wherein.

DETAILED DESCRIPTION OF THE INVENTION

Hereinafter an example of the exemplary embodiment of the present invention is explained with referring to the drawings.

First Exemplary Embodiment

Figure 1:
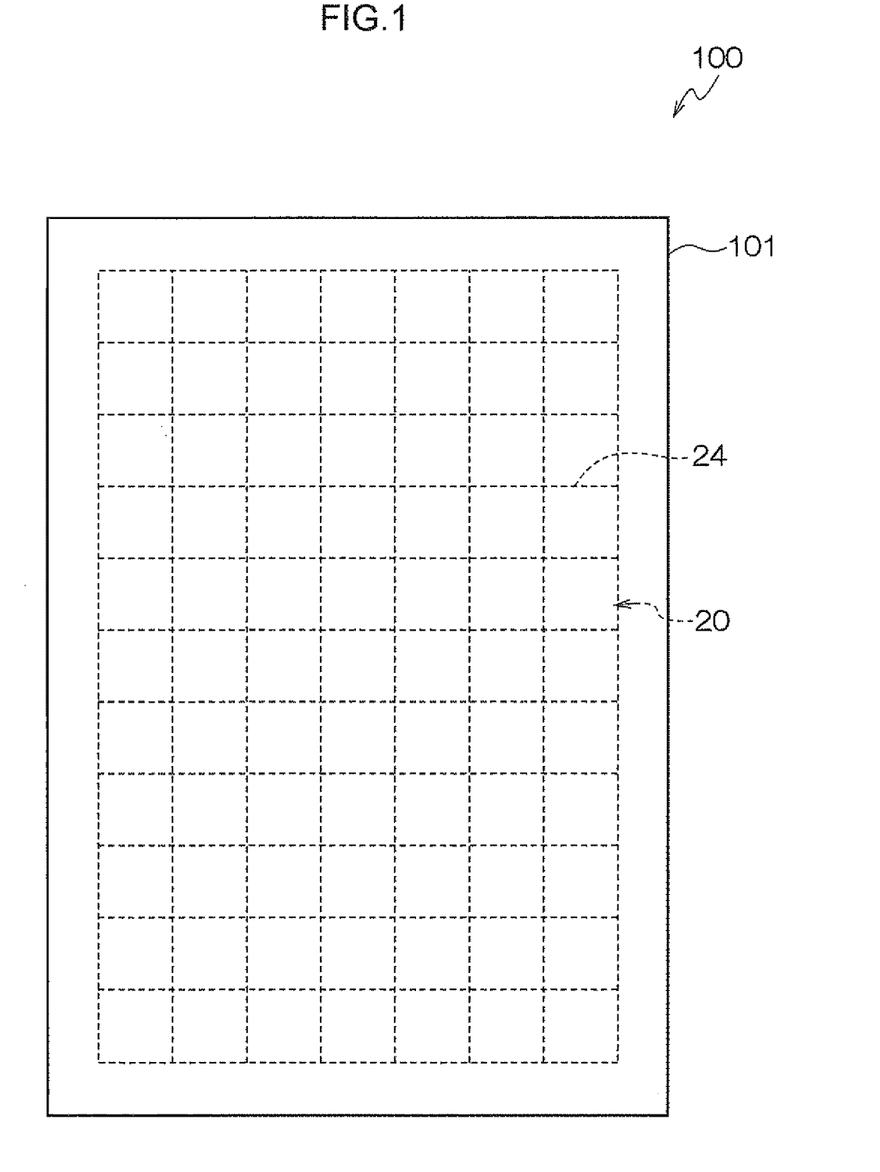
FIG. 1 is a schematic plane view which shows a display apparatus of a first exemplary embodiment.
Figure 2:
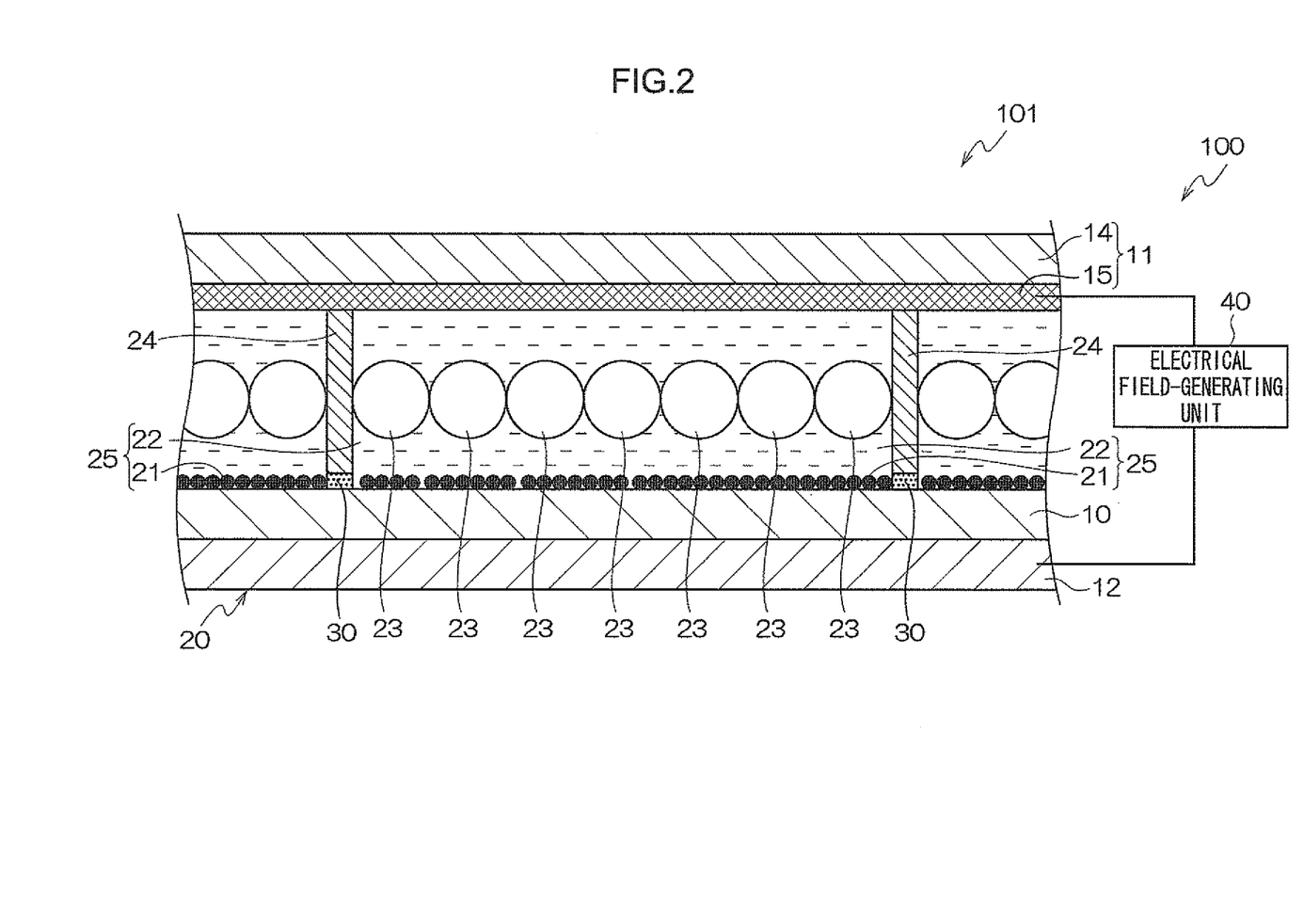
FIG. 2 is an enlarged schematic cross-sectional view which shows the display apparatus of the first exemplary embodiment.
Figure 3:
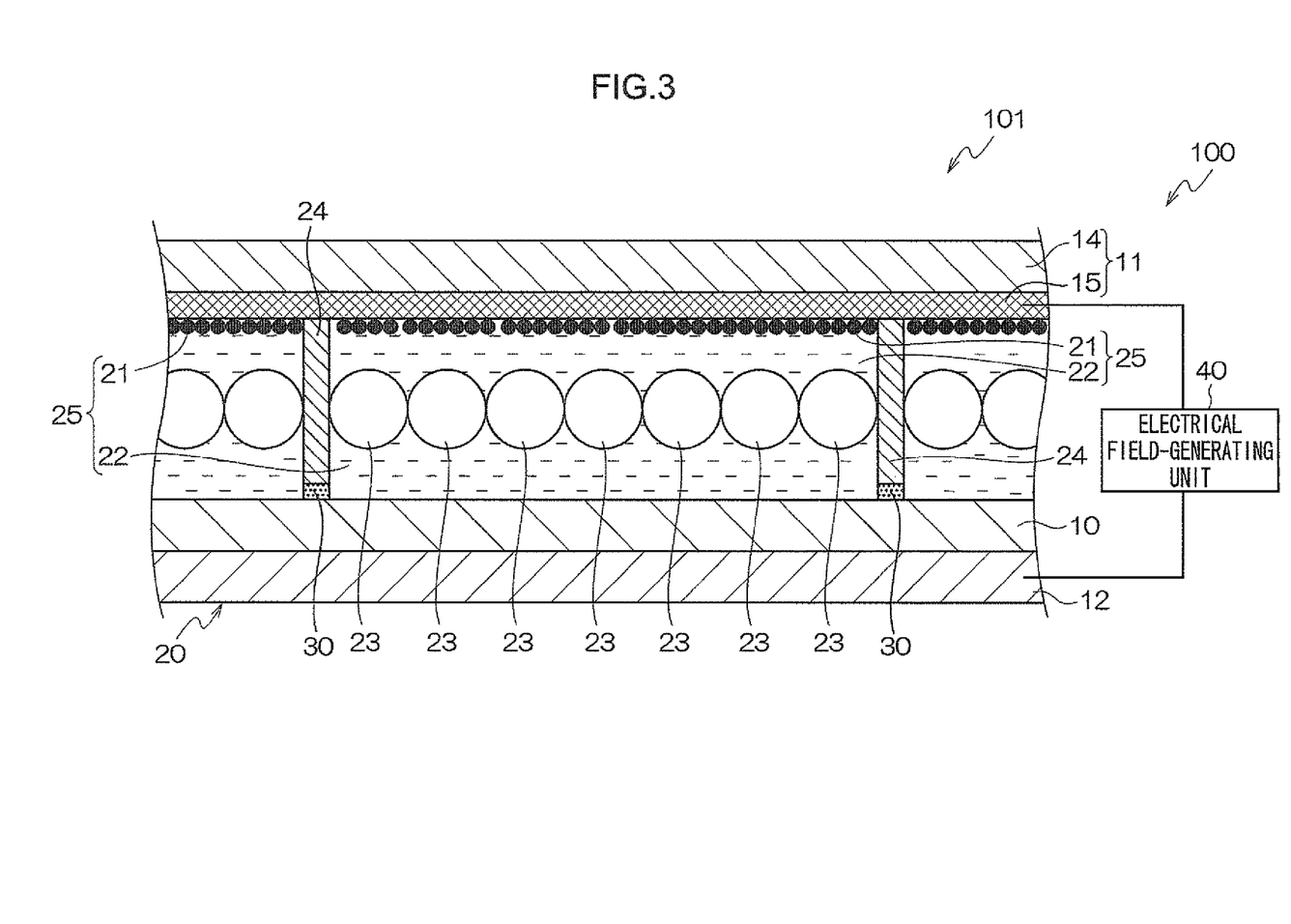
FIG. 3 is an enlarged schematic cross-sectional view which shows the display apparatus of the first exemplary embodiment.

FIG. 1 is a schematic plane view which shows a display apparatus of a first exemplary embodiment. FIGS. 2 and 3 are enlarged schematic cross-sectional views which show the display apparatus of the first exemplary embodiment.

Meanwhile, FIGS. 2 and 3 correspond to the partial enlarged cross-sectional views of the display unit of the display medium.

The display apparatus 100 of the first exemplary embodiment is used for, for example, apparatuses by which saving and rewriting of images are possible (specifically, for example, bulletin boards, circular boards, electronic blackboards, advertisements, signboards, blinking signs, electronic papers, electronic newspapers, digital books, and document sheets which may be shared with copiers and printers).

Specifically, as shown in FIGS. 1 to 3, the display apparatus 100 of the first exemplary embodiment includes, for example, a display medium 101, and an electrical field-generating unit 40 which applies a voltage on the display medium 101 to form an electrical field in the display medium 101.

—Display Medium—

The constitution of the display medium 101 of the present exemplary embodiment is explained.

The display medium 101 includes, for example, a surface substrate 11 (an example of the first substrate) which is used as an image display surface, a back surface substrate 10 (an example of the second substrate) which is disposed facing the surface substrate 11 with a gap against the surface substrate 11, a compartment member 24 (an example of the gap retaining member) which is disposed between the back surface substrate 10 and surface substrate 11, retains the gap between the substrates and sections the gap between the substrates into plural compartments, and a display unit 20 which is disposed on an area surrounded by the back surface substrate 10, the surface substrate 11 and the compartment member 24 (an example of the member for retaining the gap between the substrates).

Furthermore, the back surface substrate 10 has a rear substrate 12 on the surface which is opposite to the surface which faces the surface substrate 11.

The display unit 20 is constituted by, for example, a particle dispersion liquid 25 including migrating particles 21 and a dispersion medium 22 in which the migrating particles 21 are dispersed. Namely, the display unit 20 is constituted in a state in which the particle dispersion liquid 25 is enclosed in an area surrounded by the back surface substrate 10, the surface substrate 11 and the compartment member 24.

Furthermore, for example, reflective particles 23 are enclosed together with the particle dispersion liquid 25 in the display unit 20 so that the reflective particles 23 are present over the whole surface area of the back surface substrate 10 in the direction of the surface of the substrate between the back surface substrate 10 and the surface substrate 11.

The compartment member 24 is disposed, for example, in a state that the member is attached to an adhesive layer 30 on the surface (the surface which faces the surface substrate 11) of the back surface substrate 10, and in a state that the member is fixed on the surface (surface which faces the back surface substrate 10) of the surface substrate 11 by direct formation by various formation methods (the state also includes a state that the member is fixed without an adhesive).

Furthermore, the adhesive layer 30 including a solvent-drying type adhesive 30A including an adhesive component which is insoluble in the dispersion medium 22 of the particle dispersion liquid 25 is applied as the adhesive layer 30.

Next, the method of manufacturing the display medium of the present exemplary embodiment is explained.

Figure 4A:
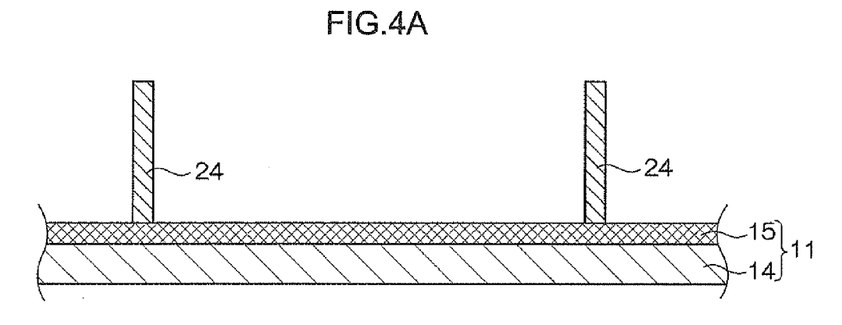
FIG. 4A is a process drawing which shows the method of manufacturing the display medium of the first exemplary embodiment.
Figure 4B:
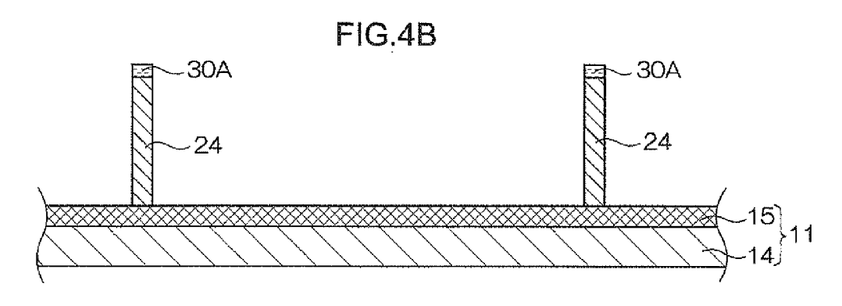
FIG. 4B is a process drawing which shows the method of manufacturing the display medium of the first exemplary embodiment.
Figure 4C:
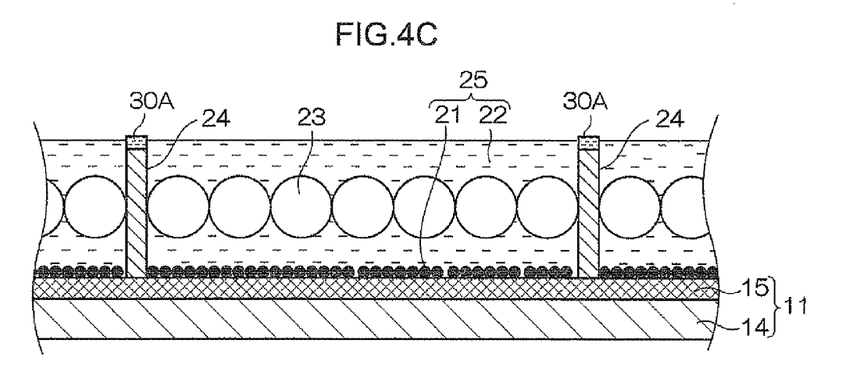
FIG. 4C is a process drawing which shows the method of manufacturing the display medium of the first exemplary embodiment.
Figure 5D:
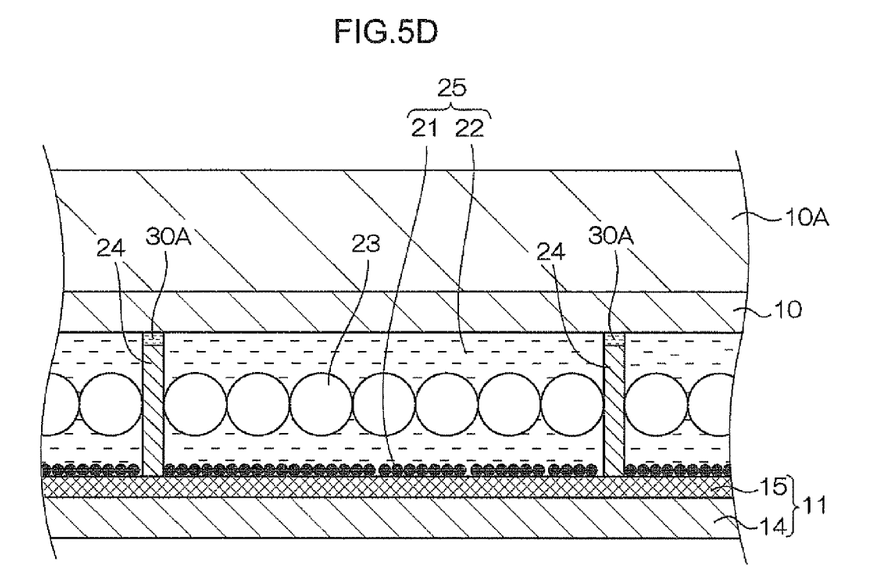
FIG. 5D is a process drawing which shows the method of manufacturing the display medium of the first exemplary embodiment.
Figure 5E:
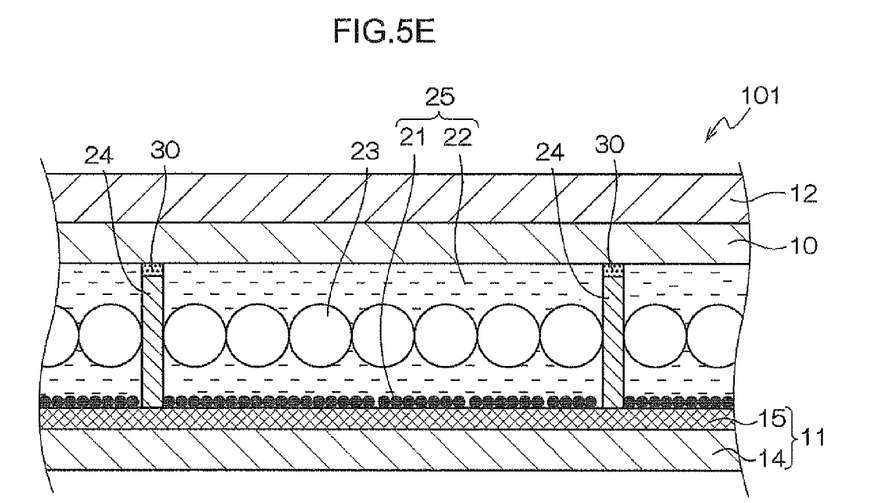
FIG. 5E is a process drawing which shows the method of manufacturing the display medium of the first exemplary embodiment.

FIGS. 4 and 5 are process drawings which show the method of manufacturing the display medium of the present exemplary embodiment.

The compartment member 24 is, for example, a frame-shaped member composed of four planes, not having a bottom plane or a top plane. In the drawings, the frame-shaped member is shown as two poles, one pole representing one plane, with only two poles (that is, two planes) being shown for the sake of convenience.

First, as shown in FIG. 4A, for example, a surface substrate 11 on which a compartment member 24 is disposed in a protruded form is prepared. Specifically, for example, the compartment member 24 is disposed on a surface of the surface substrate 11 (the surface facing the back surface substrate 10) so that a surface of the surface substrate 11 forms a bottom plane of the compartment member 24 (that is, the compartment member 24 is provided on the surface of the surface substrate 11 in a protruded form). The plane form of each area (space) defined by the compartment member 24 (a form viewed in the direction of the thickness of the substrate) is a quadrangular shape, which may be a rectangular shape or a square shape. A pair of opposing sides of the quadrangular shape may be parallel to a longitudinal direction of the surface substrate 11, and the other pair of opposing sides of the quadrangular shape may be parallel to a width direction of the surface substrate 11.

The surface substrate 11 is constituted by including a substrate main body 14, and a surface electrode 15 which is formed on the surface which faces the back surface substrate 10 of the substrate main body 14.

The surface substrate 11 becomes at least an image display surface, and has translucency. The translucency refers to that visible light has a transmittance of 60% or more. The same applies to the following.

Examples of a material for constituting the substrate main body 14 include glass, plastics, polyethylene terephthalate resins, polyethylene naphthalate resins, polycarbonate resins, acrylic resins, polyimide resins, polyester resins, epoxy resins, and polyether sulfone resins.

The substrate main body 14 may have flexibility or may not have flexibility. For example, when the back surface substrate 10 and the surface substrate 11 are adhered together by roll-to-roll method when the display medium 101 is prepared, a substrate main body having flexibility is selected.

Examples of the material which constitutes the surface electrode 15 include oxides such as indium, tin, cadmium, and antimony, composite oxides such as ITO, metals such as gold, silver, copper and nickel, and organic materials such as polypyrrole and polythiophene. These materials constitute the electrode, for example, as a monolayer film, a mixed film or a composite film. Furthermore, each electrode is formed by using these materials by, for example, deposition method, sputtering method, coating method, CVD method (chemical vapor deposition method) or the like.

On the other hand, the compartment member 24, which is a member that is disposed between the back surface substrate 10 and the surface substrate 11, has a function of retaining the gap between the substrates, in addition to having a function of defining the gap between the substrates into plural compartments.

Alternatively, the compartment member 24 may have a configuration so as to have only a function of retaining the gap between the substrates of the back surface substrate 10 and the surface substrate 11 and not have a function of defining the gap between the substrates into plural compartments. Namely, not only an embodiment in which the compartment member 24 is used singly but also an embodiment in which another gap retaining member for retaining the gap between the substrates may be further provided, is available.

Examples of the material for constituting the compartment member 24 include thermoplastic resins, thermosetting resins, electron beam-curing resins, photo-curing resins, rubbers, and metals.

Examples of the method of forming the compartment member 24 include 1) a method including forming a layer of a photosensitive resin having adhesion property (e.g., thermoplastic resins: acrylic resins, acrylates, and urethanes) on one of the back surface substrate 10 and the surface substrate 11, exposing the layer by utilizing photolithography method to form a latent image on the layer of the resin, and developing the image to form the member, 2) a method including embossing the resin by heat nano imprinting or photo nano imprinting or nano imprinting by a combination thereof, and 3) other known method.

Although the compartment member 24 may be colored or colorless, it is desirably colorless and transparent so as to not affect adversely a display image displayed on the display medium 101, and in such case, for example, a transparent resin such as polystyrene, polyester and acrylic is used. The "transparent" means having a transmittance of 50% or more with respect to visible light.

Next, as shown in FIG. 4B, an adhesive 30A is applied, for example, on the top surface of the compartment member 24.

Specifically, for example, the adhesive 30A is applied by an amount at which the adhesive does not protrude outside the compartment member 24 after adhering the back surface substrate 10 and drying the solvent.

As the adhesive 30A, the adhesive 30A including an adhesive component which is insoluble in the dispersion medium 22 of the particle dispersion liquid 25 and a solvent which is incompatible with the dispersion medium 22 of the particle dispersion liquid 25 may be used.

The adhesive 30A is a solvent-drying type adhesive 30A which attaches the members by drying (removing) the solvent.

As used herein, insoluble means that the dissolution degree of a solid component with respect to 100 mL of a liquid component is 0.01 g or less at 25° C.

On the other hand, incompatible means that plural liquid components are not mixed and present as individual phases at 25° C.

The adhesive 30A may be any of a water-soluble adhesive and an oil-soluble adhesive, but the adhesive is preferably water-soluble.

The adhesive component may be a component which is dissolved in the solvent (as used herein, dissolution means a state in which remaining of a dissolved product may not be confirmed visually) and included in the adhesive 30A, or a component which is insoluble and emulsified in the solvent, and included in the adhesive 30A.

Specific examples of the adhesive component include water-based adhesive components such as urea-based resins, melamine-based resins, phenol-based resins, resorcinol-based resins, aqueous polymer-isocyanate (aqueous vinyl urethane)-based resins and α-olefin-maleic anhydride-based resins; emulsion-based adhesive components such as vinyl acetate, EVA and acrylic resins; and water-soluble polymer-based adhesive components such as polyvinyl alcohol, polyethylene oxide, polyvinyl pyrrolidone, glue, gelatin, agar, starch and casein.

Specific examples of the solvent include alcohols such as methanol, ethanol and isopropyl alcohol; ether-acetals such as diethyl ether, dioxane and tetrahydrofuran; ketone-aldehydes such as acetone; polyvalent alcohols such as ethylene glycol and glycerin, and derivatives thereof; carboxylic acids such as lactic acid; various waters such as distilled water, ion exchanged water, pure water, ultrapure water, RO water (water passed through a reverse osmosis film) and deuterated water; other liquids, ammonia, dimethylsulfoxide, diphenylsulfone, N-methylpyrrolidone, N-dimethyleneacetamide, N,N'-dimethylformamide and mixed water-base solutions thereof; and aqueous hydrogen peroxide, citric acid, solutions of ammonia hydroxide, aqueous solutions of inorganic acids, aqueous solutions of metal salts; and the like.

Examples of the method of applying the adhesive 30A include bar coater method, cap coater method, die coater method, screen printing method, inkjet method, and transfer method.

Next, as shown in FIG. 4C, the particle dispersion liquid 25 is disposed in the area surrounded by the surface substrate 11 and the compartment member 24.

Specifically, for example, the area surrounded by the surface substrate 11 and the compartment member 24 is filled with the particle dispersion liquid 25 by adding dropwise the particle dispersion liquid 25 to the area, whereby the particle dispersion liquid 25 is disposed in the area. In addition, for example, the reflective particles 23 may also be disposed in the area surrounded by the surface substrate 11 and the compartment member 24.

Here, the particle dispersion liquid 25 is constituted by the migrating particles 21 and the dispersion medium 22 to which the migrating particles 21 are dispersed.

Examples of the dispersion medium 22 include insulating liquids. As used herein, "insulating" means that a volume resistivity is $10^7$ Ω·cm or more.

Examples of the insulating liquid include aromatic hydrocarbons such as benzene-based hydrocarbons such as benzene, toluene, o-xylene, m-xylene, p-xylene, mixed xylene, ethylbenzene, hexylbenzene, dodecylbenzene and phenylxylylethane; aliphatic hydrocarbons such as paraffin-based hydrocarbons such as n-hexane and n-decane, isoparaffin-based hydrocarbons such as ISOPER (manufactured by Exxon Chemical Company), olefin-based hydrocarbons such as 1-octene and 1-decene, and naphthene-based hydrocarbons such as cyclohexane and decarin; petrolatums or hydrocarbon mixtures derived from petrolatums such as kerosene, petrolatum ether, petrolatum benzine, ligroin, industrial gasoline, coal tar naphtha, petrolatum naphtha and solvent naphtha; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane and iodoform; silicone oils (organic silicone oils) such as dimethylsilicone oil and methylphenylsilicone oil; and fluorine-based solvents (organic fluorine-based solvents) such as hydrofluoro ether.

The volume resistivity of the dispersion medium 22 may be, for example, $10^7$ Ω·cm or more, desirably from $10^7$ Ω·cm to $10^{19}$ Ω·cm, more desirably from $10^{10}$ Ω·cm to $10^{19}$ Ω·cm. By adjusting the volume resistivity to this range, an electrical field is applied to each of the migrating particles 21 (or to cluster thereof), and generation of air bubbles by electrolysis of the dispersion medium 22 due to an electrode reaction is suppressed.

When necessary, for example, an acid, an alkali, a salt, a dispersion stabilizer, and additives aiming at preventing oxidation, absorption of UV ray (e.g., a stabilizer, an antibiotic, and an antiseptic) may be added to the dispersion medium 22. However, it is desirable that these are added so that the volume resistivity is within the above specific range.

For example, a charge controlling agent (e.g., an anionic surfactant, a cationic surfactant, an amphoteric surfactant, a nonionic surfactant, a fluorine-based surfactant, a silicone-based surfactant, a metal soap, alkyl phosphate esters, and succinic acid imides) may be added to the dispersion medium 22.

Furthermore, the migrating particles 21 are constituted by, for example, clusters of plural particles, are dispersed in the dispersion medium 22, and transfer between the substrates of the back surface substrate 10 and the surface substrate 11 in accordance with the direction and strength of the electrical field generated between the substrates.

Examples of the migrating particles 21 include insulating metal oxide particles such as glass beads, alumina and titanium oxide, thermoplastic or thermosetting resin particles, particles obtained by fixing a colorant on the surfaces of these resin particles, particles including an insulating colorant in a thermoplastic or thermosetting resin, and metal colloid particles having the color strength due to the surface plasmon reasonance.

When necessary, for example, a charge controlling agent for controlling charging property may be incorporated into the resin which constitutes the migrating particles 21. Furthermore, where necessary, a magnetic material may be incorporated into the inner portions and/or surfaces of the migrating particles 21. In addition, an external additive may be attached to the surfaces of the migrating particles 21 when necessary.

Furthermore, the reflective particles 23 have optical reflection property which is different from that of the particles which constitute the migrating particles 21. A void through which each particle which constitutes the migrating particles 21 may pass is formed between the reflective particles 23. The reflective particles 23 may be constituted so as to be dispersed in the dispersion medium 22, and transferred together with the flow of the dispersion medium 22 when the migrating particles 21 transfer, whereby passage of migrating particles 21 is enabled.

"Having optical reflection property which is different from that of the particles which constitute the migrating particles 21" means that, when the dispersion medium 22 in which only the migrating particles 21 are dispersed and the reflective particles 23 are compared and observed visually, they have identifiable differences in at least any one of chromaticity, brightness and intensity. In addition, among these chromaticity, brightness and intensity, it is specifically desirable that chromaticity is different.

The "identifiable difference" specifically means, for example, when chromaticity is different, the differences in a* and b* are each 5 or more when the CIELAB values of the dispersion medium 22 in which only the migrating particles 21 are dispersed and of the reflective particles 23 are respectively measured by X-RITE 404 (trade name, manufactured by X-Rite).

Next, as shown in FIG. 5D, the back surface substrate 10 is contacted with the adhesive 30A applied to the top surface (the surface which faces the back surface substrate 10) of the compartment member 24, the solvent of the adhesive 30A is dried, the back surface substrate 10 is attached to the top surface of the compartment member 24 by the adhesive component included in the adhesive 30A, and the surface substrate 11 and the back surface substrate 10 are adhered together via the compartment member 24.

By adhering the back surface substrate 10 and the surface substrate 11 together via the compartment member 24, the particle dispersion liquid is sealed in the area surrounded by the back surface substrate 10, the surface substrate 11 and the compartment member 24 to constitute the display unit 20.

Specifically, it is preferable to adhere the surface substrate 11 and the back surface substrate 10 together via the compartment member 24, for example, in a state that the back surface substrate 10 is supported by a support substrate 10A which has a larger thickness than that of the back surface substrate 10, namely, for example, in a state that the support substrate 10A and the surface which is opposite to the surface facing the surface substrate 11 of the back surface substrate 10 are adhered together. In addition, after the back surface substrate 10 and the surface substrate 11 are adhered together via the compartment member 24, the support substrate 10A is peeled off from the back surface substrate 10.

The back surface substrate 10 may be translucent. As used herein, translucent means that the transmittance of visible light is 60% or more.

Furthermore, the back surface substrate 10 is preferably a substrate which allows permeation of the vaporized solvent of the adhesive 30A and does not allow permeation of the vaporized dispersion medium 22 of the particle dispersion liquid 25.

The "permeation" means that a transmittance with respect to the vaporized solvent of the adhesive 30A is 50 g/m$^2$·day or more. The wordings of "does not allow permeation" means that a transmittance with respect to the vaporized dispersion medium 22 of the particle dispersion liquid 25 is less than 50 g/m$^2$·day, and more preferably less than 20 g/m$^2$·day.

The transmittance is a value obtained by the "Method of testing permeated humidity of moistureproof packaging materials" according to JIS Z 0208. When the transmittance with respect to the solvent of the adhesive 30A is lower than 50 g/m$^2$·day, it is difficult to cure the adhesive 30A, or a long time period is required for curing.

Specific examples of the substrate which allows permeation of the vaporized solvent of the adhesive 30A and does not allow permeation of the vaporized dispersion medium 22 of the particle dispersion liquid 25, which is applied as the back surface substrate 10, include films formed of urea-based resins, melamine-based resins, phenol-based resins, resorcinol-based resins, α-olefin-maleic anhydride-based resins, vinyl acetate-based resins, acrylic-based resins, polyvinyl alcohol-based resins, polyethylene oxide-based resins, polyvinyl pyrrolidone-based resins, and natural resins such as glue, gelatin, agar, starch and casein.

Further, examples of the substrate which allows permeation of the vaporized solvent of the adhesive 30A and does not allow permeation of the vaporized dispersion medium 22 of the particle dispersion liquid 25, preferably include a film which is formed by including a reactive polyvinyl alcohol or a methanol containing polyvinyl alcohol. More specifically, the substrate may be, for example, a substrate in which cross-linked material (that is, cured material) obtained by cross-linking a reactive polyvinyl alcohol with a cross-linking agent is included.

In a case where the substrate mentioned above is applied, the adhesive 30A is preferably water-soluble.

Examples of the reactive polyvinyl alcohol include a modified polyvinyl alcohol having an acetoacetyl group as a reactive group in the molecule. Specific examples of the reactive polyvinyl alcohol include GOHSEFIMER Z (trade name, manufactured by Nippon Synthetic Chemical Industry Co., Ltd.), and specific examples of the methanol containing polyvinyl alcohol include GOHSEFIMER L (trade name, manufactured by Nippon Synthetic Chemical Industry Co., Ltd.).

It is preferable that the back surface substrate 10 (surface which faces the surface substrate 11) has a larger contact angle with respect to the dispersion medium 22 of the particle dispersion liquid 25 than the contact angle with respect to the solvent of the adhesive 30A. In other words, it is preferable to select the dispersion medium 22 of the particle dispersion liquid 25 and the solvent of the adhesive 30A so that the contact angles have such relationship. By doing so, adhesion power between the back surface substrate 10 and the top surface of the compartment member 24 are readily secured.

On the other hand, it is preferable that the support substrate 10A is also a substrate which allows permeation of the vaporized solvent of the adhesive 30A. Preferable examples of the material which constitutes such support substrate 10A include moisture permeable films (e.g., OPULENT (trade name, manufactured by Tohcello Inc.)), porous films (e.g., NITOSEP (trade name, manufactured by Nitto Denko Corporation), microporous films (manufactured by Sumitomo 3M, Ltd.), as well as films having relatively high gas permeability (e.g., films of low density polyethylene, and stretched polypropylene), porous ceramics, and punching stainless steel plates.

In addition, as shown in FIG. 5E, after the back surface substrate 10 and the surface substrate 11 are adhered together via the compartment member 24, the support substrate 10A is peeled off from the back surface substrate 10, and a rear substrate 12 is laminated on the back surface substrate 10 (on the surface opposite to the surface facing the surface substrate 11) to give the display medium 101.

As used herein, the rear substrate 12 is, for example, called as a back plane in which driving circuits such as transistors (TFT: Thin Film Transistor and the like) and diodes and electrodes having a monolayer or multilayer structure are disposed on a substrate (e.g., a resin substrate (e.g., plastic substrates: a polyester resin film, and a polyimide resin film), a glass substrate, and a metal substrate).

—Electrical Field-Generating Unit 40—

The electrical field-generating unit 40 is explained.

The electrical field-generating unit 40 is electrically connected to the rear substrate 12 (the electrodes thereof which are not depicted) and the surface electrode 15. The electrical field-generating unit 40 is a voltage-applying apparatus for applying a voltage to the rear substrate 12 and the surface electrode 15, and an electrical field is formed between the rear substrate 12 and the surface electrode 15 by applying a voltage between the rear substrate 12 and the surface electrode 15 by the electrical field-generating unit 40. In addition, the electrical field-generating unit 40 of the display apparatus 100 may be connected so as to be separable from the display medium 101 (the rear substrate 12 and the surface electrode 15). In this case, the electrical field-generating unit 40 is constituted, for example, so as to connect the display medium 101 to the electrical field-generating unit 40 to display image information only when writing or displaying of the display medium 101 is necessary, whereas the display medium 101 and the electrical field-generating unit 40 are separated each other during storage so as to improve carrying property of the display medium 101.

Although the above constitution includes electrodes on both the rear substrate 12 and the surface substrate 11, an electrode may be disposed on either substrate. In this case, for example, the surface electrode 15 is grounded and only the rear substrate 12 is connected to the electrical field-generating unit 40.

—Display of Display Medium 101 on Display Unit 20—

In the display unit 20 of the display medium 101, when a voltage is applied from the above electrical field-generating unit 40 to the rear substrate 12 and the surface electrode 15 of the display medium 101, an electrical field corresponding to the applied voltage is formed in the dispersion medium 22.

By the formed electrical field, migrating particles 21 transfer between the substrates of the back surface substrate 10 and the surface substrate 11. For example, when the particles which constitute the migrating particles 21 are negatively charged, and a positive voltage is applied to the back surface substrate 10 and a negative voltage is applied to the surface electrode 15, the particles which constitute the migrating particles 21 transfer from the side of the surface substrate 11 to the side of the back surface substrate 10 through the voids among the reflective particles 23 (see FIG. 2). At this time, when one observes visually from the side of the surface substrate 11, the color of the reflective particles 23 is visually confirmed as the color of the display medium 101.

On the other hand, when a negative voltage is applied to the rear substrate 12 and a positive voltage is applied to the surface electrode 15, the particles which constitute the migrating particles 21 transfer from the side of the back surface substrate 10 to the side of the surface substrate 11 through the voids among the reflective particles 23 (see FIG. 3). At this time, when one observes visually from the surface substrate 11, the color of the migrating particles 21 positioned on the side of the surface substrate 11 is confirmed visually as the color of the display medium 101.

Alternatively, the display medium 101 may be constituted so that the reflective particles 23 are charged with different polarity from that of the migrating particles 21 and are transferred toward the direction opposite to that of the migrating particles 21 between the substrates when a voltage is applied to the rear substrate 12 and the surface electrode 15.

The display medium 101 of the present exemplary embodiment as explained above is prepared by adhering the back surface substrate 10 and the surface substrate 11 together by applying the adhesive 30A on the top surface of the compartment member 24 disposed on the surface substrate 11, adhering the back surface substrate 10 and the top surface of the compartment member 24 together in a state that the particle dispersion liquid 25 are disposed in the area surrounded by the surface substrate 11 and the compartment member 24 to allow contact with the adhesive 30A, and drying (removing the solvent).

Furthermore, the adhesive 30A including an adhesive component which is insoluble in the dispersion medium 22 of the particle dispersion liquid 25 and a solvent which is incompatible with the dispersion medium 22 of the particle dispersion liquid 25 is used as the adhesive 30A.

When the particle dispersion liquid 25 is disposed in the area surrounded by the surface substrate 11 and the compartment member 24 in a state that the adhesive 30A is applied to the top surface of the compartment member 24, the particle dispersion liquid 25 transferred to the top surface of the compartment member 24 are repelled by the adhesive 30A since the solvent included in the adhesive 30A is incompatible with the dispersion medium 22 of the particle dispersion liquid 25, whereby adhesion of the particle dispersion liquid 25 (specifically the dispersion medium 22 thereof) to the adhesive 30A (the surface of the adhesive 30A which is to be contacting with the back surface substrate 10) is suppressed.

When the back surface substrate 10 is contacted with the adhesive 30A applied to the top surface of the compartment member 24 in this state, adhesion is realized in a state that the particles dispersion liquid 25 (specifically the dispersion medium 22 thereof) does not intervene and the adhesive component of the adhesive 30A is tightly bound to the back surface substrate 10 without being dissolved in the particle dispersion liquid 25 (specifically the dispersion medium 22 thereof).

Therefore, in the present exemplary embodiment, when the first substrate and the second substrate are adhered together in a state that the particle dispersion liquid is disposed in the area surrounded by the first substrate and the gap retaining member, adhesion power between the back surface substrate 10 (one example of the second substrate) and the compartment member 24 (one example of the gap retaining member) is secured.

Furthermore, since the back surface substrate 10 realizes adhesion by the adhesive layer 30 (adhesive 30A) only on the top surface of the compartment member 24, a state in which the adhesive 30A (adhesive layer 30) is difficult to present on the display unit 20 when viewed from the direction of the thickness of the substrate may be created. Namely, the adhesive component of the adhesive 30A is absent on the surface corresponding to the particle dispersion liquid 25 ("the surface corresponding to the particle dispersion liquid 25" refers to a display surface which means an area of the display unit 20, except that the compartment member 24 being adhered to the display unit 20) of the surface which faces the surface substrate 11 on the back surface substrate 10, in other words, the adhesive component of the adhesive 30A is absent on a surface of the back surface substrate 10 that faces the surface substrate 11, except where the surface corresponds to the top surface of the compartment member 24, whereby interruption of the electrical field which transfers the migrating particles 21 of the particle dispersion liquid 25 by the adhesive layer 30 is suppressed. As a result, transfer defect and loss of light permeability of the migrating particles 21 in the display unit 20 due to the adhesive 30A (adhesive layer 30) are suppressed.

Furthermore, in the present exemplary embodiment, when the particle dispersion liquid 25 is disposed in the area surrounded by the surface substrate 11 and the compartment member 24 in a state that the adhesive 30A is applied to the top surface of the compartment member 24, even if the particle dispersion liquid is not disposed in each surrounded area, for example, even if the particle dispersion liquid is uniformly applied to the surface of the surface substrate 11 in which plural compartments are arranged, the particle dispersion liquid 25 (specifically the dispersion medium 22 thereof) is repelled by the adhesive 30A since the solvent included in the adhesive 30A is incompatible with the dispersion medium 22 of the particle dispersion liquid 25, whereby a state in which the particle dispersion liquid 25 is not attached to the adhesive 30A applied to the top surface of the compartment member 24 may be created, and such state is advantageous in view of production costs.

Furthermore, since the back surface substrate 10 is adhered together with the surface substrate 11 by being attached to only on the top surface of the compartment member 24 by the adhesive 30A (adhesive layer 30) in the present exemplary embodiment, a state in which the adhesive 30A (adhesive layer 30) is difficult to present on the display unit 20 when viewed from the direction of the thickness of the substrate can be created. As a result, interruption of the display electrical field and loss of light permeability on the display unit 20 due to the adhesive 30A (adhesive layer 30) are suppressed.

On the other hand, when a substrate which allows permeation of the vaporized solvent of the adhesive 30A and does not allow permeation of the vaporized dispersion medium 22 of the particle dispersion liquid 25 is applied (especially, when a substrate formed by including a reactive polyvinyl alcohol or a methanol containing polyvinyl alcohol, provided that a water-soluble adhesive is applied as the adhesive 30A, is applied) as the back surface substrate 10 to the present exemplary embodiment, the solvent of the adhesive 30A becomes difficult to remain in the area surrounded by the back surface substrate 10, and the dispersion medium 22 of the particle dispersion liquid 25 becomes difficult to reduce, the surface substrate 11 and the compartment member 24 when the solvent of the adhesive 30A is dried (vaporized). Therefore, display failure based thereon (deterioration of the migration property of the migrating particles 21) is also suppressed.

Furthermore, in the present exemplary embodiment, when the surface substrate 11 and the back surface substrate 10 are adhered together via the compartment member 24 in a state that the support substrate 10A and the surface which is opposite to the surface facing the surface substrate 11 of the back surface substrate 10 are adhered together, wrinkles and the like are not generated and the adhering is realized with fine planar accuracy even the thickness of the back surface substrate 10 is thin (e.g., from 1 μm to 100 μm). Namely, making the back surface substrate 10 into a thin film may be realized, and as a result, effect of the thickness of the back surface substrate 10 on image display is decreased.

Furthermore, since the display medium 101 of the present exemplary embodiment has the adhesive layer 30 which includes the solvent-dry type adhesive 30A including an adhesive component which is insoluble in the dispersion medium 22 of the particles dispersion liquid 25, which is for attaching the back surface substrate 10 to the compartment member 24 wherein the adhesive layer 30 is disposed between the back surface substrate 10 and the compartment member 24 but is not disposed on the surface corresponding to the particle dispersion liquid 25 ("surface corresponding to the particle dispersion liquid 25" has the same meaning as described above) of the surface which faces the surface substrate 11 of the back surface substrate 10, attaching to the back surface substrate 10 by the adhesive component is realized in a state that the adhesive component is not dissolved in the particle dispersion liquid 25 (specifically the dispersion medium 22 thereof). Therefore, adhesion power between the back surface substrate 10 and the compartment member 24 is secured.

Furthermore, since the back surface substrate 10 is attached to only the top surface of the compartment member 24 by the adhesive layer 30 (adhesive 30A), a state in which the adhesive 30A (adhesive layer 30) is difficult to present on the display unit 20 when viewed from the direction of the thickness of the substrate may be created, i.e., since the adhesive component of the adhesive 30A is absent on a surface of the back surface substrate 10 that faces the surface substrate 11, except where the surface corresponds to the top surface of the compartment member 24, interruption of an electrical field which transfers the migrating particles 21 of the particles dispersion liquid 25 by the adhesive layer 30 is suppressed. As a result, transfer defect and loss of light permeability in the display unit 20 due to the adhesive 30A (adhesive layer 30) are suppressed.

Second Exemplary Embodiment

Figure 6:
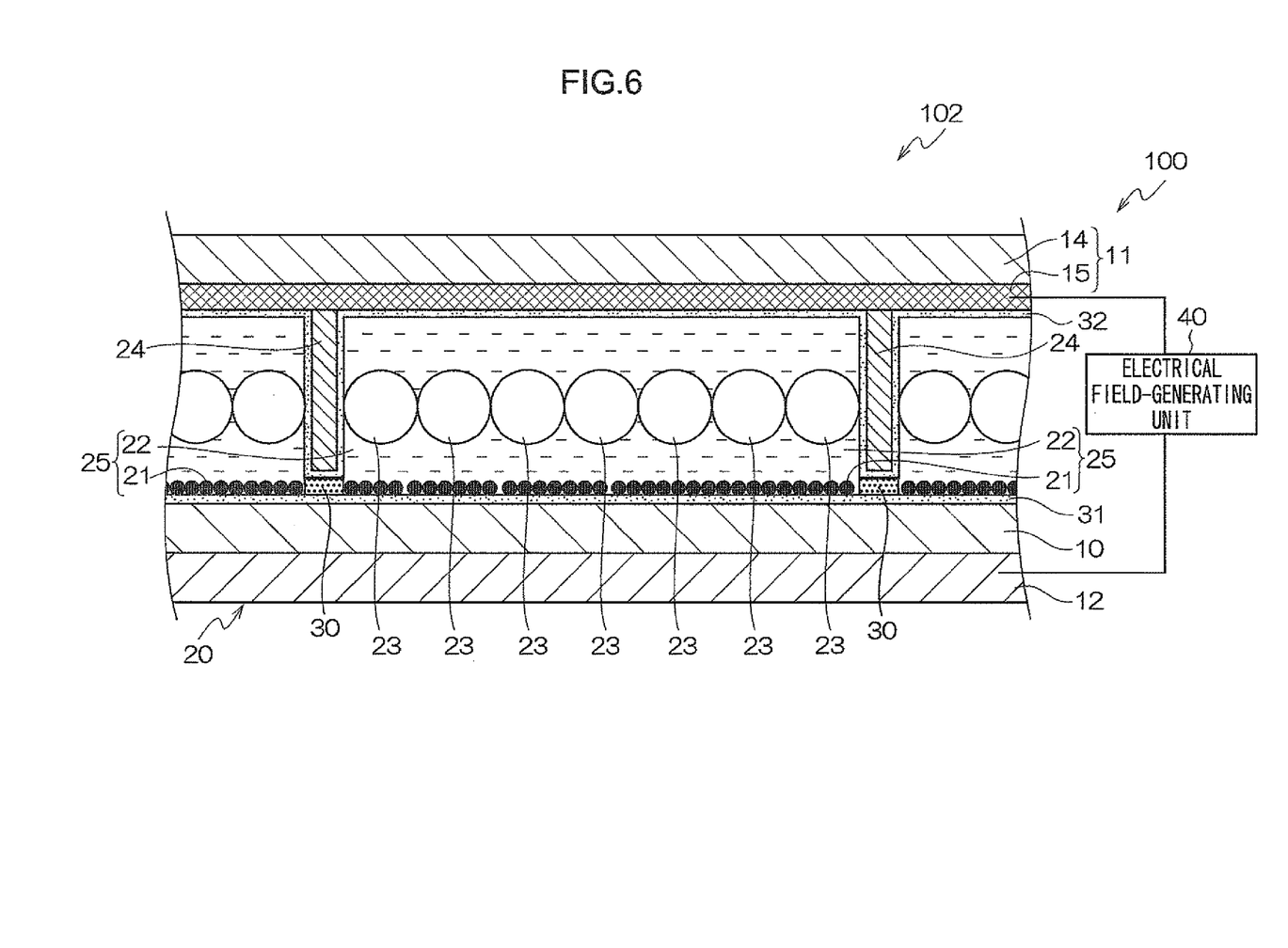
FIG. 6 is an enlarged schematic cross-sectional view which shows the display apparatus of a second exemplary embodiment.

FIG. 6 is an enlarged schematic cross-sectional view which shows the display apparatus of a second exemplary embodiment.

As shown in FIG. 6, the display apparatus 100 of the second exemplary embodiment is an embodiment including a display device 102 including a sealing layer 31 which is disposed on the surface (surface which faces the surface substrate 11) of the back surface substrate 10.

In the display medium 102 of the second exemplary embodiment, a layer which is insoluble in the solvent of the adhesive 30A and has a smaller contact angle with respect to the solvent of the adhesive 30A than that of the back surface substrate (the surface which faces the surface substrate 11) is applied to the sealing layer 31 which is disposed on the surface (the surface which faces the surface substrate 11) of the surface substrate 10.

Furthermore, a layer which is insoluble in the solvent of the adhesive 30A and has a smaller contact angle with respect to the solvent of the adhesive 30A than that of the top surface of the compartment member 24 is also disposed as the sealing layer 32 on the surfaces of the compartment member 24, that is, the side in which the particles dispersion liquid 25 is disposed (side surfaces and top surface of the compartment member 24) and the surface (the surface which faces the back surface substrate 10 thereof: however, the application is not necessarily overlapped on the area on which the compartment member 24 is disposed) of the surface substrate 11, i.e., the surfaces which constitute the area surrounded by the compartment member 24 and surface substrate 11 together with the top surface of the compartment member 24.

The method of manufacturing the display medium 102 of the second exemplary embodiment is explained.

Figure 7A:
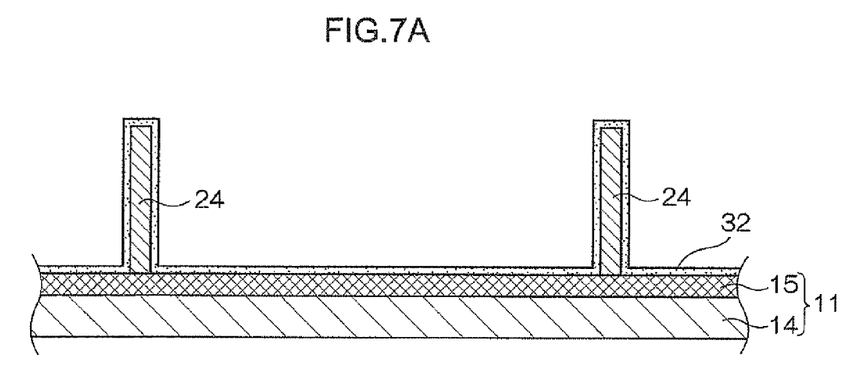
FIG. 7A is a process drawing which shows the method of manufacturing the display medium of the second exemplary embodiment.

The compartment member 24 is, as explained in the first exemplary embodiment, a frame-shaped member composed of four planes, not having a bottom plane and a top plane. In the drawings, the frame-shaped member is shown as two poles, one pole representing one plane, with only two poles (that is, two planes) being shown for the sake of convenience. At first, as shown in FIG. 7A, for example, a surface substrate 11 on which a compartment member 24 is disposed in a protruded form is prepared. Specifically, for example, the compartment member 24 is disposed on a surface of the surface substrate 11 (surface which faces the back surface substrate 10) so that a surface of the surface substrate 11 forms a bottom plane of the compartment member 24 (that is, the compartment member 24 is provided on the surface of the surface substrate 11 in a protruded form).

Furthermore, the sealing layer 32 is formed on the surfaces of the compartment member 24, that is, the side in which the particles dispersion liquid 25 is disposed (side surfaces and top surface of the compartment member 24) and the surface (the surface which faces the back surface substrate 10 thereof: however, the area on which the compartment member 24 is disposed is not necessarily doubly disposed) of the surface substrate 11, i.e., the surfaces which constitute the area surrounded by the compartment member 24 and surface substrate 11 together with the top surface of the compartment member 24.

The sealing layer 32 which is formed on the surface substrate 11 and the compartment member 24 is a layer which is insoluble in the solvent of the adhesive 30A and has a smaller contact angle with respect to the solvent of the adhesive 30A than that of the top surface of the compartment member 24.

The sealing layer 32 is insoluble in the solvent of the adhesive 30A, and for example, may have a swelling ratio of 120% or more (desirably from 100% to 150%) when contacted with the solvent of the adhesive 30A.

The swelling ratio is a value obtained as follows. An individual piece to be measured is soaked in a solvent for 1 hour, and the ratio of the change in the volume of the individual piece after soaking in the solvent with respect to the volume of the individual piece before soaking in the solvent was obtained and considered as a swelling ratio.

The sealing layer 32 has a smaller contact angle with respect to the solvent of the adhesive 30A than the contact angle with respect to the solvent of the adhesive 30A on the top surface of the compartment member, and the contact angle thereof is specifically, for example, 40° or less (desirably from 0° to 30°).

The contact angle is a value which is obtained by using a contact angle meter (CA-X: manufactured by Kyowa Interface Science Co., Ltd.), adding dropwise about 3.1 µl of a solvent to be applied to a surface to be measured under an environment of 25° C. and 50% RH, and measuring the contact angle of the liquid droplet at 15 seconds after the dropwise addition. Specifically, the liquid droplet of the solvent which is added dropwise to the surface to be measured is photographed by using optical microscopic photography, and the contact angle θ of water is obtained from the photograph. Then, the contact angle of the liquid droplet of the solvent is measured for 15 points (e.g., 15 points in total, three fractions in the circumference direction and five fractions in the axis direction) throughout the entire surface of the surface to be measured, an average value is obtained, and the obtained average value is considered as the contact angle in the present exemplary embodiment.

Figure 7B:
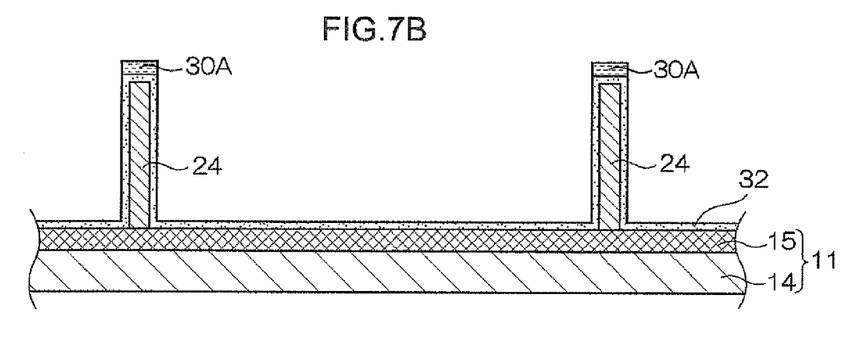
FIG. 7B is a process drawing which shows the method of manufacturing the display medium of the second exemplary embodiment.

Next, as shown in FIG. 7B, the adhesive 30A is applied to, for example, the top surface of the compartment member 24 on which the sealing layer 32 has been disposed. Namely, the adhesive 30A is applied to the top surface of the compartment member 24 via the sealing layer 32.

Figure 7C:
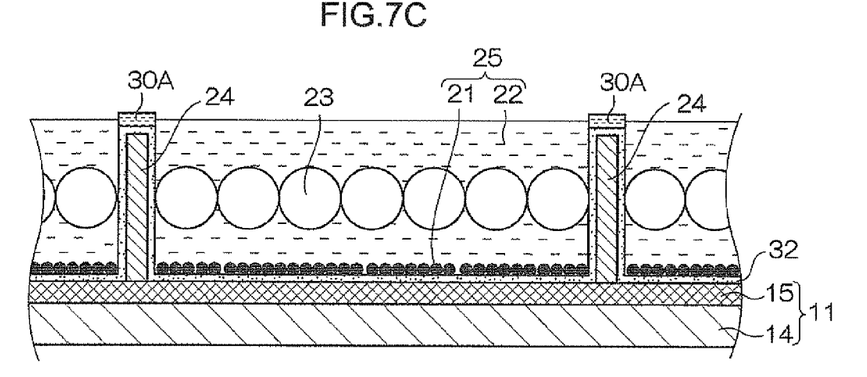
FIG. 7C is a process drawing which shows the method of manufacturing the display medium of the second exemplary embodiment.

Next, as shown in FIG. 7C, the particle dispersion liquid 25 is disposed in the area surrounded by the surface substrate 11 and the compartment member 24.

Figure 8D:
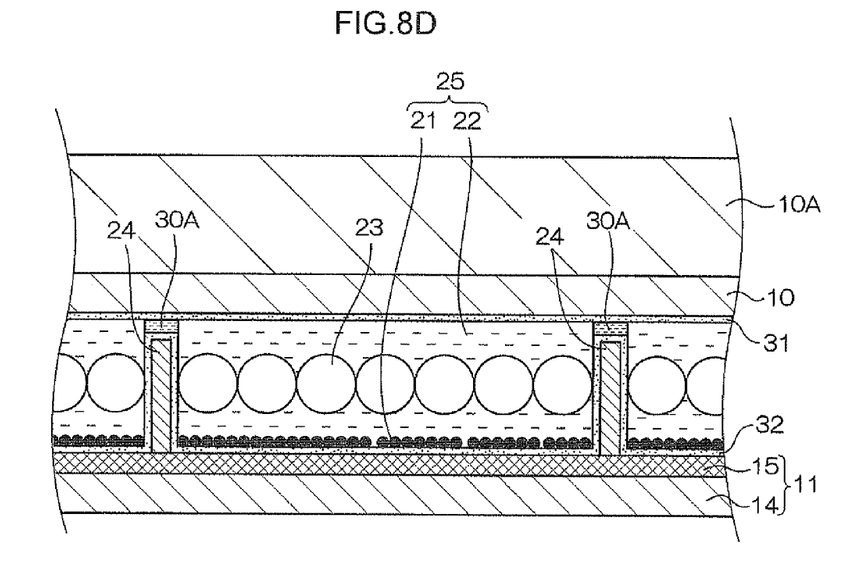
FIG. 8D is a process drawing which shows the method of manufacturing the display medium of the second exemplary embodiment.

Next, as shown in FIG. 8D, a back surface substrate 10 including the sealing layer 31 formed on the surface (the surface which faces the surface substrate 11) in advance is prepared, the sealing layer 31 disposed on the back surface substrate 10 is contacted with the adhesive 30A applied to the top surface (the surface which faces the back surface substrate 10) of the compartment member 24 (namely, the back surface substrate 10 is contacted with the adhesive 30A via the sealing layer 31) and thereafter the solvent of the adhesive 30A is dried to adhere the sealing layer 31 of the back surface substrate 10 to the top surface of the compartment member 24 with the adhesive component of the adhesive 30A, whereby the surface substrate 11 and the back surface substrate 10 are adhered together via the compartment member 24.

As used herein, the sealing layer 31 to be disposed on the back surface substrate 10 is a layer which is insoluble in the solvent of the adhesive 30A and has a smaller contact angle with respect to the solvent of the adhesive 30A than that of the surface (the surface which faces the surface substrate 11) of the back surface substrate. Specifically, the sealing layer 31 may be the same as the sealing layer 32 which is formed on the surface substrate 11 and the compartment member 24, or may be different from the sealing layer 32.

However, the sealing layer 31 is preferably a layer which allows penetration of the vaporized solvent of the adhesive 30A as in the back surface substrate 10.

Figure 8E:
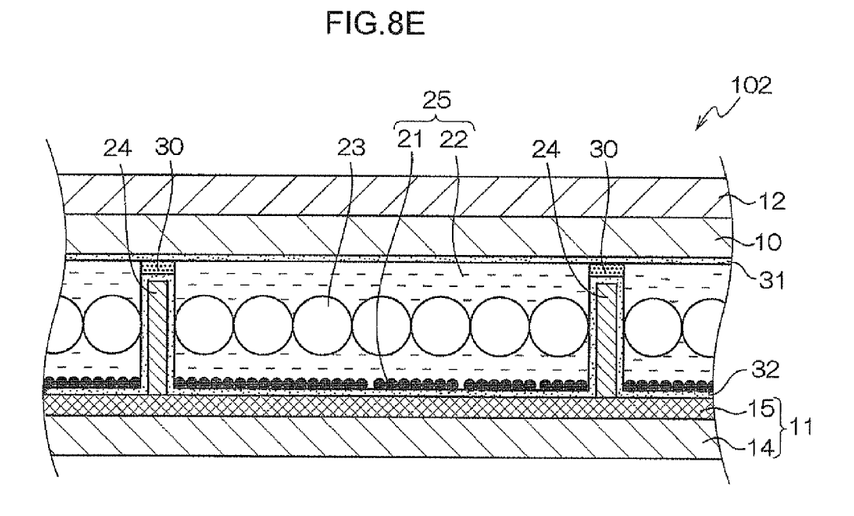
FIG. 8E is a process drawing which shows the method of manufacturing the display medium of the second exemplary embodiment.

Furthermore, as shown in FIG. 8E, the support substrate 10A is peeled off from the back surface substrate 10 after the surface substrate 11 and the back surface substrate 10 are adhered together via the compartment member 24 and the sealing layers 31 and 32, and the rear substrate 12 is laminated on the back surface substrate 10 (the surface which is opposite to the surface which faces the surface substrate 11), whereby the display medium 102 is obtained.

Other embodiments are similar to the first exemplary embodiment, and thus the explanations thereof are omitted.

The display medium 102 of the present exemplary embodiment as explained above is prepared by adhering the back surface substrate 10 and the surface substrate 11 together by applying the adhesive 30A to the top surface of the compartment member 24 disposed on the surface substrate 11, adhering the back surface substrate 10 and the top surface of the compartment member 24 together in a state that the particle dispersion liquid 25 is disposed in the area surrounded by the surface substrate 11 and the compartment member 24 to contact the back surface substrate 10 with the adhesive 30A, and drying (removing the solvent).

In this case, the back surface substrate 10 is attached to the compartment member 24 by disposing, as a sealing layer 31, a layer which is insoluble in the solvent of the adhesive 30A and has a smaller contact angle with respect to the solvent of the adhesive 30A than that of the surface (the surface which faces the surface substrate 11) of the back surface substrate (the surface which faces the surface substrate 11) on the surface of the back surface substrate 10 and contacting the sealing layer with the applied adhesive 30A.

Therefore, the adhesive 30A has better wettability on the surface of the sealing layer 31 and contacts with the sealing layer 31 in a more comfortable state than on the surface of the back surface substrate 10, but does not dissolve the sealing layer 31. Therefore, attachment in a state that the adhesive component of the adhesive 30A is tightly attached to the sealing layer 31 disposed on the back surface substrate 10 is realized.

Therefore, in the present exemplary embodiment, adhesion power between the back surface substrate 10 (one example of the second substrate) and the compartment member 24 (one example of the gap retaining member) is secured.

For the same reason, the adhesive 30A has better wettability on the surface of the sealing layer 32 and contacts with the sealing layer 32 in a more comfortable state than on the top surface of the compartment member 24, but does not dissolve the sealing layer 32. Therefore, attachment in a state that the adhesive component of the adhesive 30A is tightly attached to the sealing layer 32 disposed on the compartment member 24 is realized.

Therefore, the adhesion power between the back surface substrate 10 (one example of the second substrate) and the compartment member 24 (one example of the gap retaining member) is secured in the present exemplary embodiment.

EXAMPLES

Test Example 1

The dispersion medium 22 for the particle dispersion liquid 25, and the adhesive component and solvent for the adhesive 30A according to Table 1 are selected, and a display medium is prepared according to the manufacturing method described in the first exemplary embodiment (see FIGS. 4 and 5).

Here, the followings are applied to the back surface substrate 10, the surface substrate 11, the compartment member 24 and the support substrate 10A.

Back surface substrate 10: a reactive polyvinyl alcohol film (GOHSEFIMER Z-220 (trade name), manufactured by Nippon Synthetic Chemical Industry Co., Ltd. added with 10% of glyoxal) (transmittance with respect to the vaporized solvent of the adhesive 30A: 10 $g/m^2 \cdot day$)

Surface substrate 11: a laminate of the substrate main body 14 which is formed of a polyethylene telephthalate resin and the back surface electrode 15 which is constituted by ITO.

Compartment member 24: the compartment member 24 which is constituted by a photosensitive film material Support substrate 10A: the support substrate 10A which is constituted by a polyolefin film (transmittance with respect to the vaporized solvent of the adhesive 30A: 300 $g/m^2 \cdot day$)

TABLE 1

| | | Contact angle of back | Adhesive | | |
| | | | | Solvent | |
| | Kind of dispersion media in particle dispersion liquid | surface substrate with respect to dispersion medium | Kind | Contact angle of back surface substrate with respect to solvent | Adhesive component |
| --- | --- | --- | --- | --- | --- |
| Test Example 1-1 | Dimethylsilicone oil | 30° | Methanol | 20° | Polyvinyl alcohol |
| Test Example 1-2 | ISOPER | 50° | Pure water | 40° | Polyvinyl pyrrolidone |
| Test Example 1-3 | Hydrofluoro ether | 80° | Cyclohexane | 20° | Butyl rubber |
| Comparative Example 1-1 | Butanol | 30° | Pure water | 40° | Polyvinyl pyrrolidone |

Test Example 2

The dispersion medium for the particle dispersion liquid 25, the adhesive component and solvent for the adhesive 30A, the surface substrate 11, the sealing layer 32 to be disposed on the compartment member 24 and the sealing layer 31 to be disposed on the back surface substrate 10 according to Table 2 are selected, and a display medium is prepared according to the manufacturing method described in the second exemplary embodiment (see FIGS. 7 and 8).

Here, the back surface substrate 10, the surface substrate 11 and the compartment member 24 which are similar to those of Test Example 1 are applied.

TABLE 2

| | Kind of dispersion media in particle dispersion liquid | Contact angle of sealing layer with respect to dispersion medium | Adhesive | | | Sealing layer disposed on surface substrate, back surface substrate and compartment member (transmittance with respect to vaporized solvent of adhesive) |
| --- | --- | --- | --- | --- | --- | --- |
| | | | Solvent | | | |
| | | | Kind | Contact angle of sealing layer with respect to solvent | Adhesive component | |
| Test Example 2-1 | Dimethylsilicone oil | 30° | Isopropyl alcohol | 10° | Polyvinyl alcohol | Methanol-containing polyvinyl alcohol film GOHSEFIMER L-5407 (trade name), manufactured by Nippon Synthetic Chemical Industry Co., Ltd. (100 g/m$^2$ day) |
| Test Example 2-2 | ISOPER | 50° | Pure water | 20° | Polyvinyl pyrrolidone | Polyvinyl pyrrolidone-containing film (150 g/m$^2$ day) |
| Test Example 2-3 | Hydrofluoroether | 80° | Cyclohexane | 18° | Butyl rubber | Polyethylene film (80 g/m$^2$ day) |

—Evaluation—

A type T peeling test is performed for the display medium obtained in each example, and evaluation is performed.

Specifically, a rectangular sample of 30 mm×100 mm is prepared as a measurement sample for the display medium according to each example as mentioned above, and evaluation is performed by performing a type T peeling test using a home-built test machine using a digital force gauge (trade name: FGP-5, manufactured by Nidec-Shimpo Corporation) by peeling the back surface substrate 10 and the surface substrate 11 at a tension velocity of 2.4 mm/s.

The evaluation criteria are as follows. The results are shown in Table 3.

G5: peeling strength is 2 N or more
G4: peeling strength is from 1 N to 2 N
G3: peeling strength is from 0.5 N to 1 N
G2: peeling strength is from 0.1 N to 0.5 N
G1: peeling strength is 0.1 N or less

TABLE 3

| | Evaluation result of type T peeling test |
| --- | --- |
| Test Example 1-1 | G3 |
| Test Example 1-2 | G4 |
| Test Example 1-3 | G2 |
| Comparative Example 1-1 | G1 |
| Test Example 2-1 | G4 |
| Test Example 2-2 | G5 |
| Test Example 2-3 | G2 |

From the above results, it is found that Test Example 1 has a better evaluation result of the type T peeling test than that of Comparative Example 1-1.

Furthermore, it is also found that Test Example 2 has a generally better evaluation result of the type T peeling test than that of Test Example 1.

Although the embodiments in which the surface substrate 11 is applied as the first substrate and the back surface substrate 10 is applied as the second substrate are explained in both present exemplary embodiments, the invention is not limited to these embodiments, and an embodiment in which the back surface substrate 10 is applied as the first substrate and the surface substrate 11 is applied as the second substrate may also be available.

Furthermore, the invention is not limited to the above exemplary embodiments, and various modifications, changes or improvements are possible.

What is claimed is:

1. A method of manufacturing a display medium, comprising:
    preparing a first substrate on which a gap retaining member that retains a gap between substrates is disposed in a protruded form;
    forming a sealing layer on a surface of the first substrate and the gap retaining member;
    applying an adhesive, comprising a solvent-drying type adhesive including an an adhesive component which is insoluble in a dispersion medium of a particle dispersion liquid and a solvent which is incompatible with the dispersion medium of the particle dispersion liquid, to a top surface of the gap retaining member via the sealing layer, the sealing layer being insoluble in the solvent of the adhesive;
    disposing a particle dispersion liquid, comprising migrating particles and a dispersion medium which disperses the migrating particles, on an area surrounded by the first substrate and the gap retaining member; and
    adhering the first substrate and a second substrate together via the gap retaining member, by contacting the second substrate with the adhesive applied to the top surface of the gap retaining member and drying the solvent of the adhesive so as to adhere the second substrate to the top surface of the gap retaining member by the adhesive component of the adhesive, thereby adhering the first substrate and the second substrate together via the gap retaining member in a state in which the adhesive component of the adhesive is absent on a surface of the second substrate that faces the first substrate, except where the surface corresponds to the top surface of the gap retaining member;
    the sealing layer having a smaller contact angle with respect to the solvent of the adhesive than a contact angle with respect to the solvent of the adhesive on the top of the surface of the gap retaining member, and the contact angle of the sealing layer with respect to the solvent of the adhesive being in a range of from 0° to 30°.

2. The method of manufacturing a display medium of claim 1, wherein the second substrate allows permeation of a vaporized solvent of the adhesive and does not allow permeation of a vaporized dispersion medium of the particle dispersion liquid.

3. The method of manufacturing a display medium of claim 1, wherein the second substrate is formed by including a reactive polyvinyl alcohol or a methanol-containing polyvinyl alcohol, and the adhesive is water-soluble.

4. The method of manufacturing a display medium of claim 1, wherein the second substrate comprises a layer on the surface which faces the first substrate when the second substrate and the first substrate are adhered together, and the layer is insoluble in the solvent of the adhesive and has a smaller contact angle with respect to the solvent of the adhesive than that of the second substrate.

5. The method of manufacturing a display medium of claim 1, wherein the second substrate has a support substrate on a surface which is opposite to the surface which faces the first substrate when the second substrate and the first substrate are adhered together, the method further comprising peeling the support substrate off from the second substrate after adhering the first substrate and the second substrate together.

6. A display medium, comprising:
a first substrate;
a second substrate which is disposed so as to face the first substrate;
a gap retaining member which is disposed between the first substrate and the second substrate, the gap retaining member retaining a gap between the first substrate and the second substrate;
a sealing layer on a surface of the first substrate and the gap retaining member;
a display unit having a particle dispersion liquid, comprising migrating particles and a dispersion medium which disperses the migrating particles, the display unit being disposed in an area surrounded by the first substrate, the second substrate and the gap retaining member; and
an adhesive layer that attaches the second substrate to the gap retaining member via the sealing layer, the adhesive layer being disposed between the second substrate and the gap retaining member via the sealing layer and not being disposed on a surface of the second substrate that faces the first substrate, except where the surface corresponds to a top surface of the gap retaining member, and the adhesive layer comprising a solvent-drying type adhesive including an adhesive component which is (i) insoluble in the dispersion medium of the particle dispersion liquid and (ii) incompatible with the dispersion medium of the particle dispersion liquid, the sealing layer being insoluble in a solvent of the adhesive, the sealing layer having a smaller contact angle with respect to the solvent of the adhesive than a contact angle with respect to the solvent of the adhesive on the top surface of the gap retaining member, and the contact angle of the sealing layer with respect to the solvent of the adhesive being in a range of from 0° to 30°.

7. The display medium of claim 6, wherein the second substrate allows permeation of a vaporized solvent of the adhesive and does not allow permeation of a vaporized dispersion medium of the particle dispersion liquid.

8. The display medium of claim 6, wherein the second substrate is formed by including a reactive polyvinyl alcohol or a methanol-containing polyvinyl alcohol, and the adhesive is water-soluble.

9. The display medium of claim 6, wherein the second substrate comprises a layer on the surface which faces the first substrate when the second substrate and the first substrate are adhered together, and the layer is insoluble in the solvent of the adhesive and has a smaller contact angle with respect to the solvent of the adhesive than that of the second substrate.

10. A display apparatus comprising:
the display medium of claim 6; and
an electrical field-generating unit which forms an electrical field between the pair of substrates disposed on the display medium.

* * * * *